United States Patent [19]
Schmidt et al.

[11] Patent Number: 5,704,551
[45] Date of Patent: Jan. 6, 1998

[54] INJECTION ELEMENT OF COAXIAL DESIGN FOR ROCKET COMBUSTION ENGINES

[75] Inventors: Günther Schmidt; Dietrich Haeseler, both of Taufkirchen, Germany

[73] Assignee: Daimler-Benz Aerospace AG, Ottobrunn, Germany

[21] Appl. No.: 638,347

[22] Filed: Apr. 26, 1996

[30] Foreign Application Priority Data

Apr. 29, 1995 [DE] Germany ............... 195 15 879.2

[51] Int. Cl.⁶ ............... B05B 7/04; B05B 7/06; F02K 9/00; F02K 9/42
[52] U.S. Cl. ............... 239/403; 239/424.5; 239/429; 239/433; 60/258
[58] Field of Search ............... 239/403, 404, 239/405, 406, 423, 424, 424.5, 429, 430, 433, 553, 553.5, 590.5; 60/258

[56] References Cited

U.S. PATENT DOCUMENTS

| 3,468,487 | 9/1969 | Warren | 239/403 |
| 5,072,883 | 12/1991 | Vidusek | 239/403 X |
| 5,456,065 | 10/1995 | Dargies | 60/258 |

FOREIGN PATENT DOCUMENTS

| 3818623 | 7/1989 | Germany | 60/258 |
| 4305154C1 | 2/1993 | Germany |  |

*Primary Examiner*—Andres Kashnikow
*Assistant Examiner*—Robin O. Evans
*Attorney, Agent, or Firm*—McGlew and Tuttle

[57] ABSTRACT

Injection element of coaxial design for rocket combustion engines and for operation with two propellants, at least one of which disintegrates into drops with difficulty only, comprising a central body for the more readily disintegrating propellant (oxidant), whose flow channel generates a conical drop distribution at the outlet; a sleeve concentrically surrounding the central body to form an annular flow channel for the less readily disintegrating propellant (fuel); and a flow splitter which splits this propellant flow into a plurality of individual flows. The flow splitter has an even number of passage channels, which are uniformly distributed around the central body and cooperate in pairs in terms of an impact atomization ("impinging"), wherein the axes of two adjacent passage channels each intersect downstream of the flow splitter and upstream of their points of impact on the propellant cone discharged from the central body.

2 Claims, 1 Drawing Sheet

INJECTION ELEMENT OF COAXIAL DESIGN FOR ROCKET COMBUSTION ENGINES

FIELD OF THE INVENTION

The invention relates to rocket combustion engines in general and more particularly relates to coaxial injection elements for rocket combustion chambers for operation with two propellants, at least one of which only disintegrates into drops with difficulty as a consequence of low vapor pressure and/or high surface tension, especially for operation with nonhypergolic propellants, wherein liquid oxygen (LOX) is preferably used as the oxidant, and kerosene or monomethylhydrazine (MMH) is preferably used as the fuel wherein a central body is provided for the more readily disintegrating propellant, normally the oxidant, whose flow channel generates at the outlet a conical drop distribution and a sleeve concentrically surrounds the central body to form an annular flow channel for the less readily disintegrating propellant, normally the fuel.

BACKGROUND OF THE INVENTION

It can be expected that not even this complicated variant of the coaxial principle will operate fully satisfactorily if at least the fuel delivered through the flow splitter is reluctant to disintegrate into drops or to evaporate, starting from the liquid state, as a consequence of its physical properties (vapor pressure/surface tension). This happens rather often in the case of fuels of nonhypergolic propellant combinations.

Mechanical treatment in the so-called "impinging process" ("parallel injection"), in which individual, fine jets of propellant are injected against each other at an angle, is preferably resorted to in such cases. In deviating from the coaxial principle, both the fuel and the oxidant are now injected in the form of fine jets obliquely against each other, and arrangements with 2 to 5 (or more) injection holes are used per element. The disadvantages of this process are the rather stochastic disintegration of the jet into droplets upon impingement, the large number of "stray" drops and consequently a strong interaction between the individual elements. This results in a high susceptibility to combustion fluctuations and a poor scalability for different classes of thrust by varying the number of elements.

These disadvantages are again usually absent in coaxial injection systems.

SUMMARY AND OBJECTS OF THE INVENTION

In light of these prior-art solutions with their specific disadvantages, the object of the present invention is to provide an injection element for oxidant-fuel combinations to be introduced into rocket combustion chambers in the liquid initial state with at least one component, which disintegrates into droplets or evaporates with difficulty only, which injection element retains—with good mechanical treatment of both components—all the known advantages of the coaxial principle, e.g., high safety against combustion fluctuations and a simple scalability (thrust adjustment) by varying the number of the elements.

According to the invention, an injection element of coaxial design for rocket combustion chambers is provided for operation with two propellants. At least one of the propellants disintegrates into drops but only with difficulty as a consequence of a low vapor pressure and/or high surface tension. The injection element is especially for operation with nonhypergolic propellants, wherein liquid oxygen (LOX) is preferably used as the oxidant, and kerosene or monomethylhydrazine (MMH) is preferably used as the fuel. The injection element includes a central body for the more readily disintegrating propellant, normally the oxidant, whose flow channel generates at the outlet a conical drop distribution. A sleeve concentrically surrounds the central body to form an annular flow channel for the less readily disintegrating propellant, normally the fuel. A flow splitter which is arranged between the central body and the sleeve is provided for splitting the propellant flow into a plurality of individual flows. The flow splitter has an even number of passage channels which are uniformally distributed around the central body and generate relatively fine propellant jets and cooperate in pairs in terms of impact atomization, namely wherein an imaginary axis of two of the adjacent, cooperating passage channels each intersect (axis intersection S) downstream of the flow splitter and upstream of their—imaginary—points of impact on the fuel cone discharged from the central body. Specifically, there is an impinging at the intersection to result in the impact atomization.

The injection element according to the present invention is consequently designed as a coaxial injection element, wherein the propellant which disintegrates/evaporates less readily, usually the fuel, is passed through the outer, coaxial ring channel. By means of a flow splitter arranged there, with passage channels which are uniformly distributed around the central body and are directed in pairs at an angle toward a common intersection each, the "more sluggish" propellant is split, starting from a large, annular flow cross section, into an even number of fine jets and is further treated downstream of the flow splitter due to the impingement of two jets. The droplet fans then meet—farther downstream—the propellant cone, usually the oxidant, discharged from the central body. A sufficiently fine and homogeneous propellant mixture is thus provided for optimal combustion.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
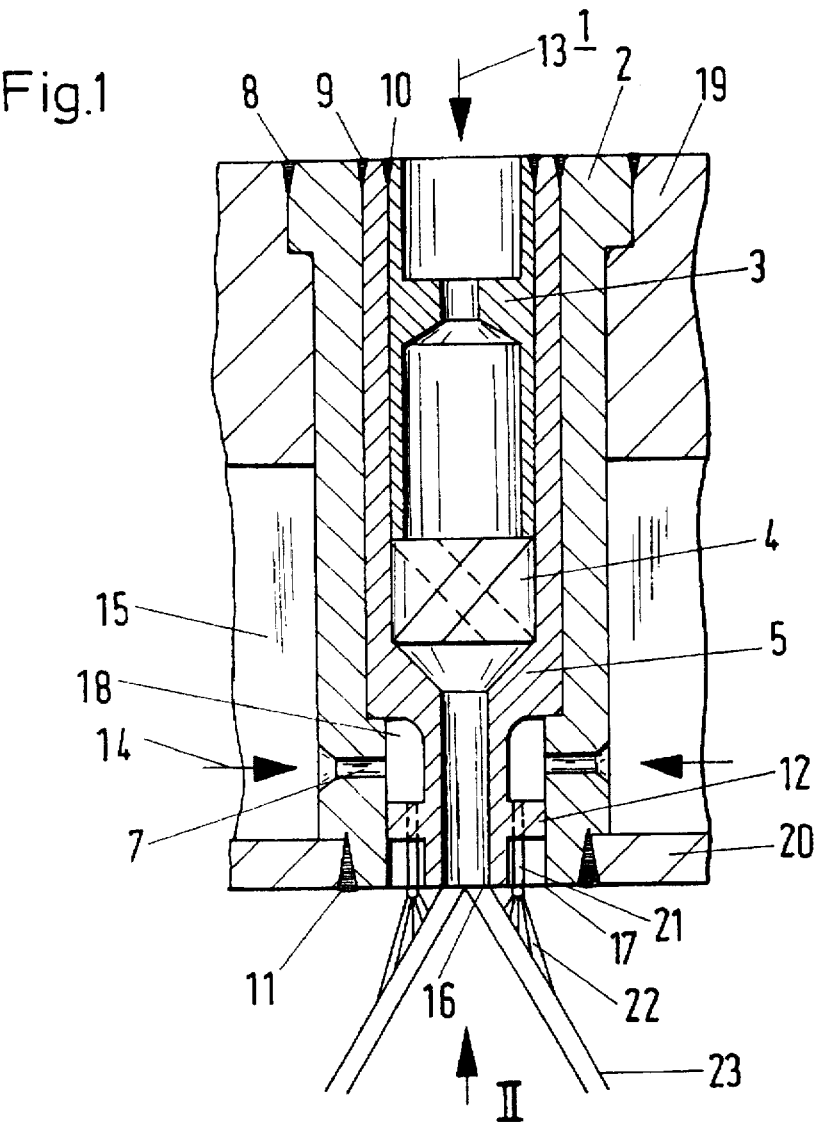
FIG. 1 is a longitudinal somewhat simplified, non-true-to-scale sectional view through an injection element with parts of the injection head.

The injection element 1 is part of the injection head of a rocket engine, and up to several hundred of such elements are installed and connected in parallel in terms of flow, depending on the size and the thrust of the engine. Each injection element 1 comprises two main parts, the central body 5 and the sleeve 2.

A flow channel, through which the oxidant 13, here, e.g., LOX, usually flows, passes through the central body 5. The throttle 3 arranged at the beginning of the channel is used to set the desired injection pressure loss and consequently for the vibration uncoupling of the combustion chamber and the delivery system. It is also used to fix the swirling insert 4, which is arranged downstream of it and through which a rotary movement is superimposed to the axial flow of the liquid oxidant 13. This swirl as well as the flow channel geometry up to the opening 16 cause the jet of oxidant to expand in a defined manner on entry into the combustion chamber and to disintegrate into many drops. A hollow cone distribution of the drops is shown as an example in this case, and this hollow oxidant cone is designated by 23.

The fuel 14, e.g., kerosene or MMH, which is to be the propellant component that can be treated with greater difficulty in this case, flows from the distributor space 15 into the annular gap 18 via radial throttle holes 7. The flow splitter 12, which is according to the preferred embodiment an integral part of the central body 5, subsequently splits the fuel flow by means of the passage channels 6 into a plurality of fine fuel jets 21 preferably having round cross sections, which impact each other in pairs at a defined angle approximately in the area of the opening 17 and disintegrate into fans of droplets 22 as a result, which in turn impact the oxidant cone 23 farther downstream, mix with the said oxidant cone and subsequently burn as a possibly homogeneous fuel/oxidant mixture.

For reasons of strength, reliability, tightness and consequently safety, most components are connected to one another via liquid- and gas-tight weld seams. The weld seam connecting the central body 5 to the sleeve 2 is designated by 9. The sleeve 2 is connected to the base plate separating the oxidant 13 from the fuel 14 via the weld seam 8 and to the combustion chamber-side front plate 20 via the weld seam 11. Finally, the weld seam 10 fixes the throttle 3 in the central body 5.

Figure 2:
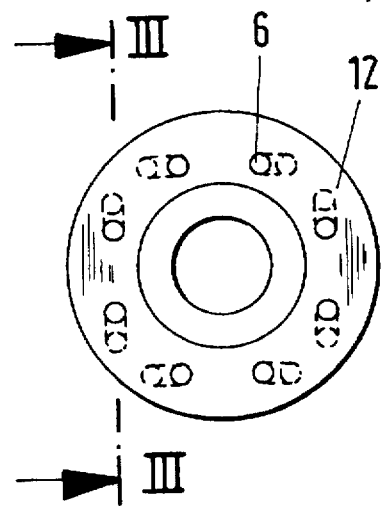
FIG. 2 is a view corresponding to arrow II in FIG. 1, showing only the flow splitter at the central body on a larger scale.

FIG. 2 shows a view of the flow splitter 12 at the central body 5 from the combustion chamber side; this view is enlarged by a factor of 2. It can be recognized that eight uniformly distributed passage channels 6, i.e., four functional pairs, are present. The number of functional pairs may, of course, also be greater or lower in actual embodiments, and experiments will certainly be necessary for an optimization. The passage channels 6 are preferably designed as straight "holes" with round cross section and can thus be prepared by, e.g., machining by means of drilling machines or by spark erosion.

Figure 3:
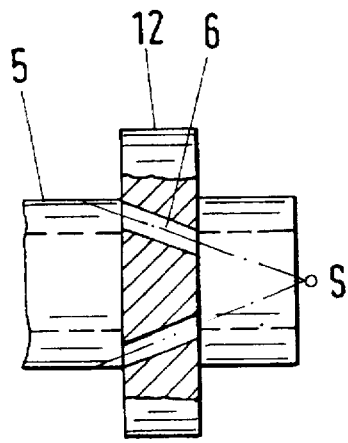
FIG. 3 is a sectional view through the flow splitter corresponding to line III—III in FIG. 2.

FIG. 3 shows a section through a functional pair, i.e., two cooperating passage channels 6. It is seen that the axes of the two passage channels 6 form an angle in relation to one another and intersect at a point S downstream of the flow splitter 12, i.e., on the combustion chamber side. The fuel jets 21 impact each other in the area of this point, while impact atomization takes place.

The exact geometry of the functional pairs, i.e., the value of the impact angle, symmetrical or possibly asymmetric orientation of the channels, the channel dimensions, etc., also require practical experiments for their optimization.

While a specific embodiment of the invention has been shown and described in detail to illustrate the application of the principles of the invention, it will be understood that the invention may be embodied otherwise without departing from such principles.

What is claimed is:

1. A rocket combustion chamber injection element for operation with two propellants including a less readily disintegrating propellant, as a consequence of a low vapor pressure and/or high surface tension and a more readily disintegrating propellant, comprising:

a central body with a flow channel with an outlet, the central body generating a conical drop distribution at said outlet forming a fuel cone, said more readily disintegrating propellant being provided in said central body;

a sleeve concentrically surrounding said central body to form an annular flow channel for said less readily disintegrating propellant;

a flow splitter arranged between said central body and said sleeve for splitting propellant flow into a plurality of individual flows, said flow splitter including an even number of passage channels which are uniformly distributed around said central body, each of said passage channels for generating a fine propellant jet, said passage channels cooperating in pairs to direct said relatively fine propellant jets of passage channel pairs to impinge each other resulting in impact atomization, wherein an axis of said passage channels of said pair intersect downstream of said flow splitter and upstream of a point of impact of said fuel cone of said conical drop distribution from said central body.

2. A rocket combustion chamber injection element of coaxial design for operation with two propellants, including at least one propellant which disintegrates into drops only with difficulty as the consequence of low vapor pressure and/or high surface tension, including operation with non-hypergolic propellants, wherein liquid oxygen (LOX) is preferably used as the oxidant, and kerosene or monomethylhydrazine (MMH) is preferably used as the fuel, comprising:

a central body for the more readily disintegrating propellant, normally the oxidant, the central body including a flow channel with an outlet, said flow channel including means for generating a conical drop distribution forming a fuel cone;

a sleeve concentrically surrounding said central body to form an annular flow channel for said less readily disintegrating propellant, normally the fuel; and a flow splitter arranged between said central body and said sleeve, said flow splitter for splitting the propellant flow into a plurality of individual flows, said flow splitter including an even number of passage channels which are uniformly distributed around said central body, each passage channel defining means for generating a relatively fine propellant jet, said passage channels cooperating in pairs in terms of impact atomization for directing said relatively fine propellant jets to impinge, wherein an—imaginary—axis of two adjacent cooperating passage channels each intersect downstream of said flow splitter and upstream of a—imaginary—points of impact on said fuel cone discharged from said central body.

* * * * *